Sept. 23, 1930.   F. E. GARBUTT ET AL   1,776,555
TRIPOD
Filed Nov. 4, 1926    2 Sheets-Sheet 2
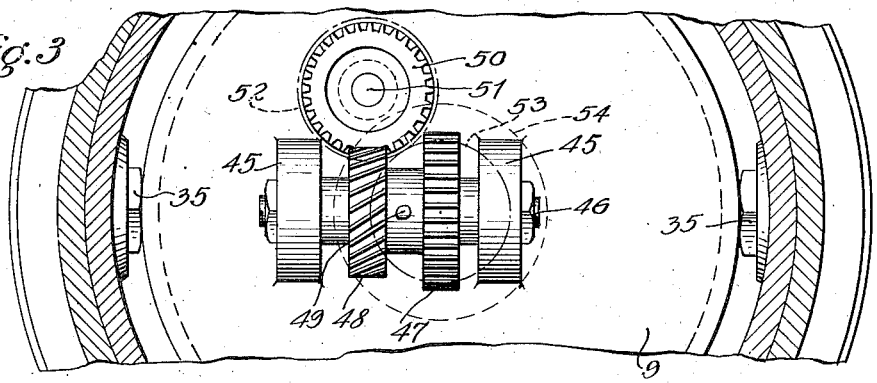
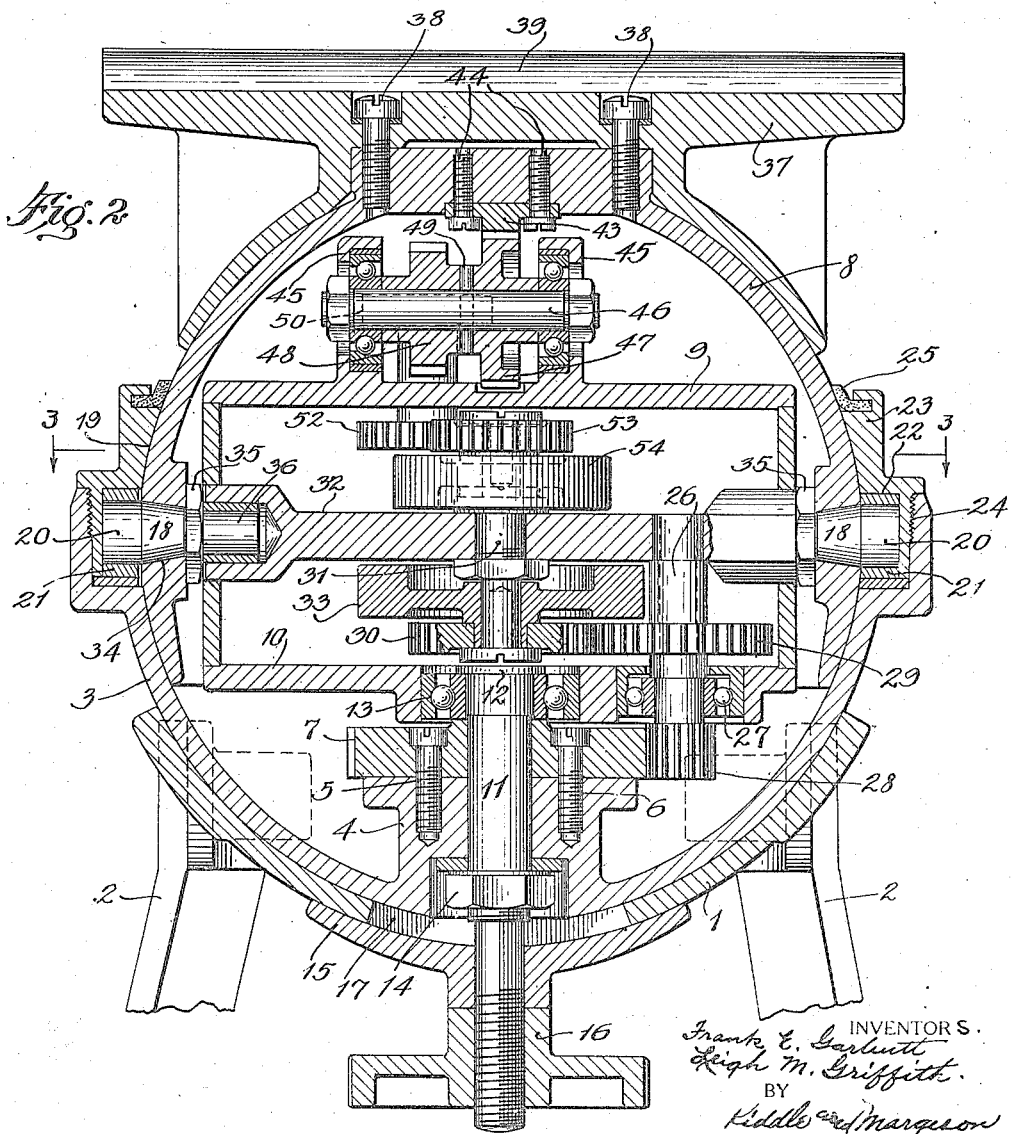
INVENTORS
Frank E. Garbutt
Leigh M. Griffith
BY
Kiddie and Marquson
ATTORNEYS Patented Sept. 23, 1930

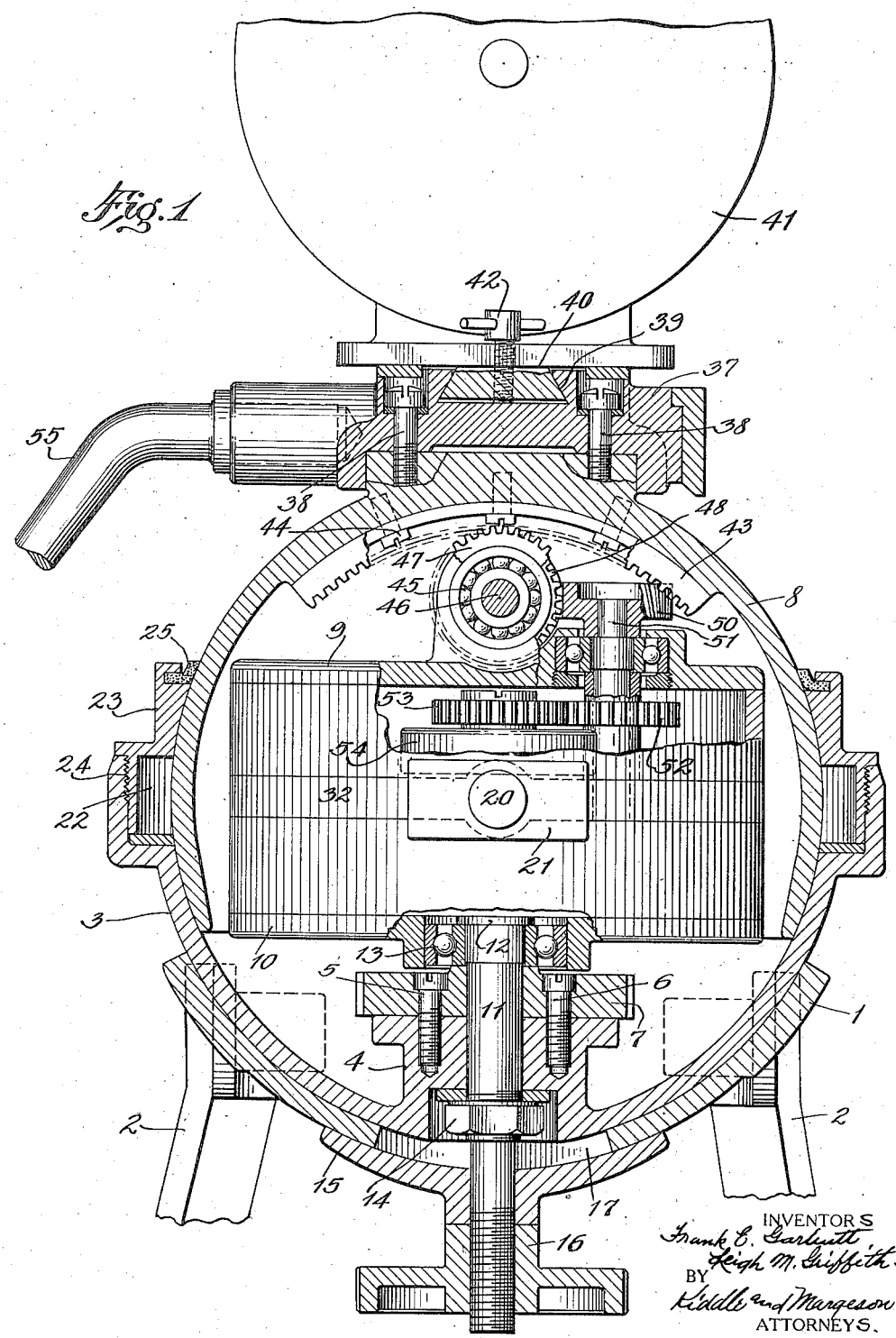

1,776,555

UNITED STATES PATENT OFFICE

FRANK E. GARBUTT AND LEIGH M. GRIFFITH, OF LOS ANGELES, CALIFORNIA, ASSIGNORS TO PARAMOUNT PUBLIX CORPORATION, OF NEW YORK, N. Y., A CORPORATION OF NEW YORK

TRIPOD

Application filed November 4, 1926. Serial No. 146,100.

This invention relates to an improvement in tripods and is directed to a tripod construction employing an instrument support which is both rotatable and tiltable, and while the present invention is broadly directed to an improved tripod construction for general use, it will be described hereinafter, for the sake of clarity, with reference to a tripod for motion picture cameras.

With reference to the use of the present tripod in motion picture photography, it should be noted that it is often necessary to focus the camera on an object traversing the scene, and it is sometimes necessary as well to follow a vertically moving object. The movement of the camera necessary in following an object traversing the scene is known in the motion picture industry as "panning," while the vertical movement is known as "tilting." Inasmuch as pictures are being taken when the camera is being panned and tilted, it is necessary that these panning and tilting movements be steady, inasmuch as if the camera be moved in a jerky fashion, this will be noticeable on a screen when a positive made from the negative is being projected, with the result that the scene will appear to have the same jerky movement that the camera had when taking the scene.

It is an object of the present invention, therefore, to provide a tripod in which the camera is carried by a rotatable and tiltable support, means being provided whereby the movement of the support, and hence that of the camera, will be steadied throughout its various movements.

It is a still further object of the present invention to provide a tripod of the character above indicated wherein a single operating means, such as a lever, is provided for panning and for tilting the camera or for panning and tilting simultaneously, the camera and its support, as above noted, being steadied throughout these movements.

A still further object of the present invention is to provide a tripod in which the instrument to be carried thereby, such as a camera, for instance, is rigidly secured to its support, whereby the camera or other instrument and its support will move as a unit at all times, so that any movement given to the support will at the same time be given the camera, so that when the support is tilted the camera is likewise tilted, and when the support is rotated or panned the camera likewise will be rotated.

A still further object of the present invention is the provision of a tripod embodying a tiltable and rotatable instrument support, the axis about which the support is tiltable always lying in the one plane during the rotation or panning of the support, and to provide a support of the character indicated, the axis of rotation of which always makes a fixed angle with the axis about which the support is tilted during the tilting and/or rotating operation.

A still further object of the present invention is the provision of a tripod comprising a tiltable and rotatable instrument support so constructed and arranged that this support may be tilted and rotated simultaneously, if desired, by a single operating means, such as a lever, the movement of the support at all times being steadied by inertia means, such as a flywheel.

A still further object of the present invention is to provide a tripod comprising a support for a camera or other instrument in which the bearings in which the support is mounted are common to the tilting and rotating movements of the support.

In the accompanying drawings, wherein one embodiment of the invention has been illustrated, Figure 1 is a sectional elevational view of a tripod with a motion picture camera mounted thereon;

Fig. 2 is a sectional elevational view similar to Fig. 1 with the apparatus rotated 90° from the showing in Fig. 1; and Fig. 3 is a section partially in plan on the line 3—3 of Fig. 2.

Referring to the drawings in detail, 1 designates a cup-shaped member carrying the tripod legs 2. The cup-shaped member 1 receives the stationary lower or base section 3 of a two-part housing, this base member being in the form of a hollow hemispherical member fitting the cup-shaped member 1.

In the bottom of the base member 3 is provided a boss or projection 4, extending upwardly, as viewed in Figs. 1 and 2, relatively to the base member.

Secured to the upper end of the boss 4 by set screws 5 and 6 is a fixed gear 7, to be referred to hereinafter.

Within the rotatable and tiltable upper or instrument-supporting section 8 of the tripod is a rotatable, non-tiltable member 9, the construction of which will be referred to in more detail hereinafter. The member 9, it might be noted, however, is hollow, and through the bottom 10 thereof extends a short stub shaft 11, this shaft, which is provided with a head 12 at its upper end, passing downwardly through a bearing 13 provided in the bottom 10 of the member 9, through the fixed gear 7 and boss 4, to the outside of the tripod entirely, as plainly shown in both Figs. 1 and 2. This stub shaft is held to the boss 4 by a nut 14.

The cup-shaped member 1, heretofore referred to and to which the tripod legs 2 are secured, is clamped between the curved outside face of the bottom of the stationary base member 3 and a curved clamp member or shoe 15. The stub shaft 11, above referred to, passes through this shoe. The lower end of the shaft 11 is provided with a nut 16, and by adjusting this nut the cup-shaped member 1, shoe 15 and base section 3 may be securely clamped to each other so as to hold the base section rigid with respect to the tripod legs.

In setting up the tripod for use, the tripod legs 2 may be placed so as to support the base section 3 as nearly as possible, in a horizontal position, and thereafter, if necessary, the nut 16 may be loosened and the base section 3, which is thereby freed, moved slightly relatively to the cup-shaped member 1, this movement being permitted by providing an opening 17 in this cup-shaped member 1. After the base 3 has been accurately positioned, the nut 16 may be tightened again so as to firmly clamp the base member 3 to the member 1.

The base member 3 telescopically receives the upper or instrument-supporting section 8, heretofore referred to, this instrument-supporting member being in the form of a hollow hemisphere. The member 8 is provided with trunnions 18 positioned diametrically opposite each other and extending beyond the outer face 19 of the instrument-supporting section 8 a slight distance, as indicated at 20. The projecting end of each trunnion carries a segmental shoe 21, the trunnion ends and the shoes riding in an annular bearing 22, provided in a ring 23, which is screwed into the base section 3, as indicated at 24, so as to, in effect, be integral with said base section.

In order that dust and other foreign matter may be kept out of the tripod housing, felt packing 25, or other suitable means, may be employed.

The construction just described in connection with the trunnions 18 and bearing 22 provides that the instrument-supporting section 8 of the tripod may be tilted or rotated, as desired, in the same bearing, so as thereby to rotate or pan as well as tilt the instrument carried by the support, the bearings for the instrument support provided by the trunnions 18 and bearing 22 being common to both the tilting and rotating or panning movements of the support.

As previously pointed out herein, one of the objects of the present invention is to provide means whereby the instrument support 8, and hence the instrument carried thereby, will be steadied throughout its movement of rotation. To this end, therefore, a stub shaft 26 is mounted for rotation in the rotatable, non-tiltable member 9, above referred to, this stub shaft being rotatable in bearings 27 in the bottom of the member 9. On the lower end of this stub shaft is keyed a pinion 28, this pinion being in constant mesh with the fixed gear 7, above referred to, attached to the boss 4 on the inside of the bottom of the stationary base section 3 of the tripod.

Keyed to the stub shaft 26 is a gear 29, this gear meshing with a gear 30 keyed to a stub shaft 31, which is rotatably mounted in a cross member 32 of the rotatable, non-tiltable gear-supporting member 9. This cross member 32 also provides one bearing for the stub shaft 26. The stub shaft 31 also carries inertia means in the form of a flywheel 33, to which the gear 30 is attached.

The trunnions 18 are tapered as indicated at 34 and drawn into the instrument-supporting member 8 so as to be rigid therewith by means of a nut 35. The trunnions extend inwardly of the instrument-supporting member 8 into the ends of the rotatable, non-tiltable member 9, as indicated at 36, so that the member 9 and the steadying means carried thereby are supported on the trunnions 18.

In the rotary motion of the instrument support 8 to pan the camera or other instrument carried thereby the trunnions 18 are moved bodily in the bearing 21, this rotation of the instrument support 8 also carrying with it the rotatable but non-tiltable member 9, the rotation of which is somewhat steadied by its bearings 13. As a result of this movement of the member 9, the pinion 28 will be rolled about the gear 7 to cause the pinion to rotate, and inasmuch as the pinion 28 is keyed to the stub shaft 26, the gears 29 and 30 will be rotated to in turn rotate the flywheel 33, thereby steadying the rotation of the instrument support 8.

As heretofore pointed out, the instrument support 8 is in the form of a hollow hemisphere, and in order that a camera or other instrument may be readily and rigidly attached thereto, we have shown a flat top casting 37 fitted to the top of the support and secured thereto, so as to, in effect, be integral therewith, by screws 38. The top of this casting is dovetailed, as indicated at 39, so as to accommodate the base 40 of a camera or other instrument 41. This camera or other instrument 41 is placed in position on the tripod and is locked rigidly thereto by any suitable locking means, such as that shown at 42. In effect, therefore, the camera or other instrument 41 is integral with the instrument support 8.

On the inside of the instrument support 8 and directly beneath the upper face of the housing is provided a gear sector 43, which is rigidly attached to the inner face of the support 8 by screws 44. The upper face of the rotatable, non-tiltable member 9 is provided with bearings 45 for a short shaft 46, this shaft carrying a spur gear 47 integral with a spiral gear 48 on the same shaft. These two gears are secured to the shaft by a pin 49, or other suitable device. The spiral gear 48 is in constant mesh with a spiral gear 50 carried at the upper end of a stub shaft 51 extending through the upper part of the member 9. The shaft 51 carries at its lower end a spur gear 52 meshing with spur gear 53 mounted on the upper end of the stub shaft 31 and rigid with a flywheel 54.

In the tilting of the instrument-supporting member 8 the gear sector 43 is tilted with the instrument support, and inasmuch as the member 9 carrying the gear 47 and spiral gear 48 is non-tiltable, these two gears will be caused to rotate, thereby setting the gears 50, 52 and 53 and the flywheel 54 in motion to thereby steady the movement of the support 8.

The support 8 is rotated and tilted by a single means, such as the lever 55, and it will be apparent that by operation of this lever the support 8 and camera 41 will be caused to move as a unit, either to rotate (pan) the camera or other instrument or to tilt the camera. If desired, both motions may be executed simultaneously by manipulation of the lever 55, as will be apparent, the camera or other instrument and its support 8 being steadied throughout by the means above described.

It will be apparent from the foregoing that the instrument support and camera or other instrument carried by the support will always move as a unit and that the support and the instrument carried thereby will tilt about an axis which always remains in the same plane no matter what the position of the instrument support 8 may be in the base 3 due to rotation of the instrument support.

It will be apparent also that the instrument support 8 and hence the camera or other instrument 41, will always be tilted about an axis which always makes a right angle with the axis of rotation of the support and the instrument carried thereby.

It will be apparent, furthermore, that when the instrument 41 and its support 8 are rotated in "panning", the axis about which the support and instrument are tilted in the "tilting" operation moves in a plane normal to the axis of tilt.

It will be apparent also that the instrument 41 moves at all times as a unit with its support 8 and that the support is tiltable about an axis always lying in the plane of the bearing 22, this bearing being common to the tilting operation of the camera and support and the rotation of the camera and support.

It will be seen also that the camera or other instrument 41 and its support 8 are tiltable and rotatable as a unit with respect to the fixed base section 3 of the tripod, the axis of tilt of the camera and its support always lying in the plane of the bearing 22, that is to say, always lying in a plane which is fixed with respect to the base 3.

It is to be understood that while a specific embodiment of the invention has been illustrated and described herein, changes may be made in the details thereof within the purview of the invention.

What we claim is:

1. A tripod comprising in combination, an instrument support, a base, a bearing in said base for said support, means for tilting and rotating said support in said bearing, and means comprising a flywheel for steadying the support throughout its tilting and rotating movements.

2. A tripod comprising in combination, an instrument support, a base on which the support is mounted, the base and support providing a housing, a bearing for the support provided by said base, means for tilting and rotating said support relatively to said base, and inertia means within said housing and operatively connected to said support for steadying the support throughout its tilting and rotating movements.

3. A tripod comprising in combination, an instrument support, a base providing a bearing for the support, means for rotating and tilting said support in said bearing relatively to said base, inertia means for steadying the support throughout its tilting movement, and inertia means for steadying the support throughout its rotating movement.

4. A tripod comprising a sectional housing, one section of the housing providing an instrument support, the other section providing a base, a bearing in said base section, trunnions received by said bearing and carried by the other section of the housing, said instrument-supporting section of the housing being tiltable relatively to the base section of the housing, and said trunnions being bodily movable in the bearing in the base section of the housing to rotate the instrument-supporting section of the housing relatively to the base section.

5. A tripod comprising in combination, a sectional housing, the upper section of said housing providing an instrument support and the lower section providing a base, bearing means connecting the two sections of the housing and limiting the movement of the upper section relatively to the lower section about two axes at right angles to each other; and inertia means within the housing for steadying the instrument-supporting section throughout its movements.

6. A tripod comprising in combination, a sectional housing, the upper section providing an instrument support, the lower section providing a base, means for tilting and rotating the instrument-supporting section relatively to the base section, a bearing in said base section in which the upper section is rotatable, said upper section being tiltable about an axis passing through said bearing, a rotatable non-tiltable member within said housing, gearing carried thereby, and gear mechanism carried by the two sections of the housing and co-operable with the first mentioned gearing to steady the instrument-supporting section of the housing throughout its tilting and rotating movements.

7. A tripod comprising in combination, a sectional housing providing an instrument-supporting section and a base section, bearing means connecting the two sections of the housing and limiting the movement of the upper section relatively to the lower section about two axes at right angles to each other, a member within the housing rotatable with the instrument-supporting section, means for guiding the said member during rotation and for holding the same against tilting during the tilting movement of the instrument-supporting section, a gear sector rigidly secured to the instrument-supporting section of the housing, and inertia means attached to the said member within the housing and co-operating with said gear sector to steady the movement of the instrument-supporting section of the housing throughout the tilting movement of the latter.

8. In combination, an instrument support, trunnions carried by said support, a base, an endless bearing in said base for receiving said trunnions to permit of the tilting of said support, and the rotation of said support, a rotatable, non-tiltable member within the base attached to said support, a bearing within said base on which said non-tiltable member is rotatable, inertia means including a gear train a part of which is secured to said support and a part to said member for steadying the support throughout its tilting movement, and inertia means including a gear train partly carried by said member and partly by said base for steadying the rotation of said support.

9. In combination, a hemispherical hollow shell or base, a hemispherical instrument-supporting member having a telescopic connection with said base, said base being provided with an annular bearing, trunnions attached to said support at diametrically opposite points and extending into said annular bearing to pivotally support the instrument support, and means for tilting said support relatively to said base, and to effect a bodily movement of said trunnions in said bearing to effect a rotation of the instrument support relatively to said base.

This specification signed by me this 19th day of October, 1926.

FRANK E. GARBUTT.

This specification signed by me this 19th day of October, 1926.

LEIGH M. GRIFFITH.